US007506334B2

(12) United States Patent
Curtis et al.

(10) Patent No.: US 7,506,334 B2
(45) Date of Patent: Mar. 17, 2009

(54) COMMON, MULTI-VERSION INTERFACE THAT ALLOWS A DISTRIBUTED SYBSYSTEM TO COMMUNICATE WITH MULTIPLE VERSIONS OF THE DISTRIBUTED SUBSYSTEM

(75) Inventors: Pavel Curtis, Bellevue, WA (US); Yiu-Ming Leung, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 11/066,719

(22) Filed: Feb. 25, 2005

(65) Prior Publication Data

US 2006/0195851 A1  Aug. 31, 2006

(51) Int. Cl.
G06F 9/44 (2006.01)
G06F 15/16 (2006.01)
G06F 3/00 (2006.01)

(52) U.S. Cl. .................. 717/170; 717/120; 709/203; 709/217; 719/316

(58) Field of Classification Search ......... 717/107–109, 717/116–123, 170; 709/201–203, 217–219; 719/313–317
See application file for complete search history.

(56) References Cited

U.S. PATENT DOCUMENTS

| 5,826,051 | A | 10/1998 | Porter et al. | |
|---|---|---|---|---|
| 5,896,128 | A | 4/1999 | Boyer | |
| 5,915,112 | A * | 6/1999 | Boutcher | 719/330 |
| 6,151,700 | A * | 11/2000 | Fox | 717/107 |
| 6,199,116 | B1 | 3/2001 | May | |
| 6,230,312 | B1 * | 5/2001 | Hunt | 717/108 |
| 6,260,187 | B1 * | 7/2001 | Cirne | 717/110 |
| 6,338,086 | B1 * | 1/2002 | Curtis et al. | 709/218 |
| 6,381,735 | B1 * | 4/2002 | Hunt | 717/158 |
| 6,493,768 | B1 * | 12/2002 | Boutcher | 719/330 |
| 6,721,942 | B1 * | 4/2004 | Sievert | 717/137 |
| 6,892,320 | B1 * | 5/2005 | Roush | 714/15 |
| 6,901,588 | B1 * | 5/2005 | Krapf et al. | 717/164 |
| 6,957,422 | B2 * | 10/2005 | Hunt | 717/130 |
| 7,055,147 | B2 * | 5/2006 | Iterum et al. | 717/170 |
| 7,171,672 | B2 * | 1/2007 | Just | 719/330 |

(Continued)

FOREIGN PATENT DOCUMENTS

WO    WO 03/071420 A2    8/2003

OTHER PUBLICATIONS

Nichols et al., "High-Latency, Low-Bandwidth Windowing in the Jupiter Collaboration System," Dec. 1995, ACM, p. 111-120.*

(Continued)

*Primary Examiner*—Wei Y Zhen
*Assistant Examiner*—Qing Chen
(74) *Attorney, Agent, or Firm*—Perkins Coie LLP

(57) ABSTRACT

A modified proxy object implements one or a multiple versions of an interface, and provides a common, multi-version interface. The common, multi-version interface is comprised of a union of all the methods of all versions of the interface that are supported by the modified proxy object. Since the common, multi-version interface allows an object to access the functionalities supported by the multiple versions of the interface, a subsystem programmed to create and use the modified proxy object(s) only needs to use the common, multi-version interface provided by the modified proxy object(s) to communicate with multiple, different versions of remote subsystems.

10 Claims, 3 Drawing Sheets

U.S. PATENT DOCUMENTS

| | | | |
|---|---|---|---|
| 7,249,155 B1 * | 7/2007 | Pestoni | 709/203 |
| 7,254,809 B2 * | 8/2007 | Kurhekar et al. | 717/146 |
| 7,260,816 B2 * | 8/2007 | Kar et al. | 717/136 |
| 7,263,687 B2 * | 8/2007 | Bloch et al. | 717/116 |
| 7,293,253 B1 * | 11/2007 | Soukup | 717/108 |
| 7,293,254 B2 * | 11/2007 | Bloesch et al. | 717/108 |
| 7,373,632 B1 * | 5/2008 | Kawaguchi et al. | 717/100 |
| 7,398,313 B1 * | 7/2008 | Inagaki et al. | 709/226 |
| 2003/0105820 A1 | 6/2003 | Haims et al. | |
| 2004/0172462 A1 * | 9/2004 | Iterum et al. | 709/223 |
| 2005/0144591 A1 * | 6/2005 | Banks | 717/122 |

OTHER PUBLICATIONS

Curtis, Pavel, "LambdaMOO Programmer's Manual," <http://www.hayseed.net/MOO/manuals/ProgrammersManual.html>, Mar. 1997.*

Smythe et al., "The RISE Platform: Supporting Social Interaction for On-line Education," Mar. 1997, ACM, p. 275-276.*

Wright et al., "A Reliable Multicast Webcast Protocol for Multimedia Collaboration and Caching," Oct. 2000, ACM, p. 21-30.*

Qu et al., "Constructing a Web-based Asynchronous and Synchronous Collaborative Environment Using WebDAV and Lotus SameTime," Oct. 2001, ACM, p. 142-149.*

Polycom Network Systems, "Deployment Of Multi-Network Video And Voice Conferencing On A Single Platform," Technical White Paper, Mar. 2003, pp. 1-16.

* cited by examiner

COMMON, MULTI-VERSION INTERFACE THAT ALLOWS A DISTRIBUTED SYBSYSTEM TO COMMUNICATE WITH MULTIPLE VERSIONS OF THE DISTRIBUTED SUBSYSTEM

TECHNICAL FIELD

The described technology is directed generally to distributed computer applications and, more particularly, to a single interface that allows a distributed subsystem to communicate with multiple versions of the distributed subsystem.

BACKGROUND

The proliferation of computers and the advent of the Internet and the maturing of the World Wide Web ("web") have significantly increased the use of distributed application programs. Examples of distributed application programs include collaboration programs, chat room programs, instant messaging programs, conferencing programs, gaming programs, and the like. Each of these application programs enable multiple, geographically distributed computer users to interactively exchange information in real time.

One prevalent method of creating the distributed application programs is to use object-oriented programming. Object-oriented programming is a method of creating computer programs by combining or linking reusable components, called "objects," to create applications. An object is a programming unit containing both data and instructions for performing operations on that data. In object-oriented programming, the operations are referred to as "methods."

Object-oriented application programs use objects to define their data and the methods that operate on the data. Typically, two objects communicate with each other via messages, which include a protocol that defines the method of communication. In distributed application programs, these objects can reside, for example, on different computing systems and across networks, within different application processes running on the same computing system, within different components/subcomponents running within the same process, different processes, or a different process on a different computing system. Distributed computing is frequently based on the client-server paradigm, and in client-server terminology, the requesting object is referred to as the client object and the servicing object is referred to as the server object.

In a distributed configuration where different subsystems—e.g., an instance of a distributed application program on a client computing system and an instance of the distributed application program on a server computing system—use distributed objects (DOs) as the mechanism for communication, the DOs are typically connected or coupled in pairs through respective remote proxy objects. For example, a client DO (the DO executing on a client computing system) uses a remote proxy object on the client computing system which models the interface of the server DO (the connected DO on the server computing system). The remote proxy object on the client computing system contains the necessary protocol information to allow the client DO to access and manipulate the server DO. Conversely, the server DO uses a remote proxy object on the server computing system which models the interface of the client DO, and the remote proxy object on the server computing system contains the necessary protocol information to allow the server DO to access and manipulate the client DO. In this regard, an interface is a collection of methods that two communicating subsystems have agreed upon before the subsystems start communicating.

Thus, in order for two subsystems to communicate with each other, the communicating subsystems need to use a single version of the interface—e.g., the remote proxy object used by the client DO needs to have the same interface version as the remote proxy object used by the server DO. Stated differently, when a source subsystem communicates with another target subsystem, the version of the interface needs to match, for example, that of the target subsystem. Since distributed applications are regularly updated to provide additional or improved features, it is inevitable that numerous versions of subsystems will need to communicate.

Currently, a subsystem that needs to communicate with different versions of a remote subsystem needs to use a different interface, one interface for each version. For example, a source subsystem that needs to communicate with two versions of a remote subsystem—e.g., one remote subsystem that supports version 1 of the interface, and a second remote subsystem that supports version 2 of the interface—will need to support both the version 1 interface and the version 2 interface. This will then allow the source subsystem to create a remote client proxy that supports the version 1 interface to communicate with the remote subsystem that supports version 1 of the interface, and a remote client proxy that supports the version 2 interface to communicate with the remote subsystem that supports version 2 of the interface. In order to support both the version 1 interface and the version 2 interface, the source subsystem code needs to be duplicated—i.e., one copy of the code that supports the version 1 interface, and another copy of the code that supports the version 2 interface—in order to account for the different "types." One drawback is the waste associated with the duplication of effort. For example, even in instances where the difference between the two versions of the interface is minimal and only affects a very small portion of the subsystem code, the programmer still needs to change the code to account for the new types.

It would be desirable to have a technique that would allow a source subsystem to communicate with target subsystems of differing interface versions without having to duplicate identical code between different versions.

DETAILED DESCRIPTION

Figure 1:
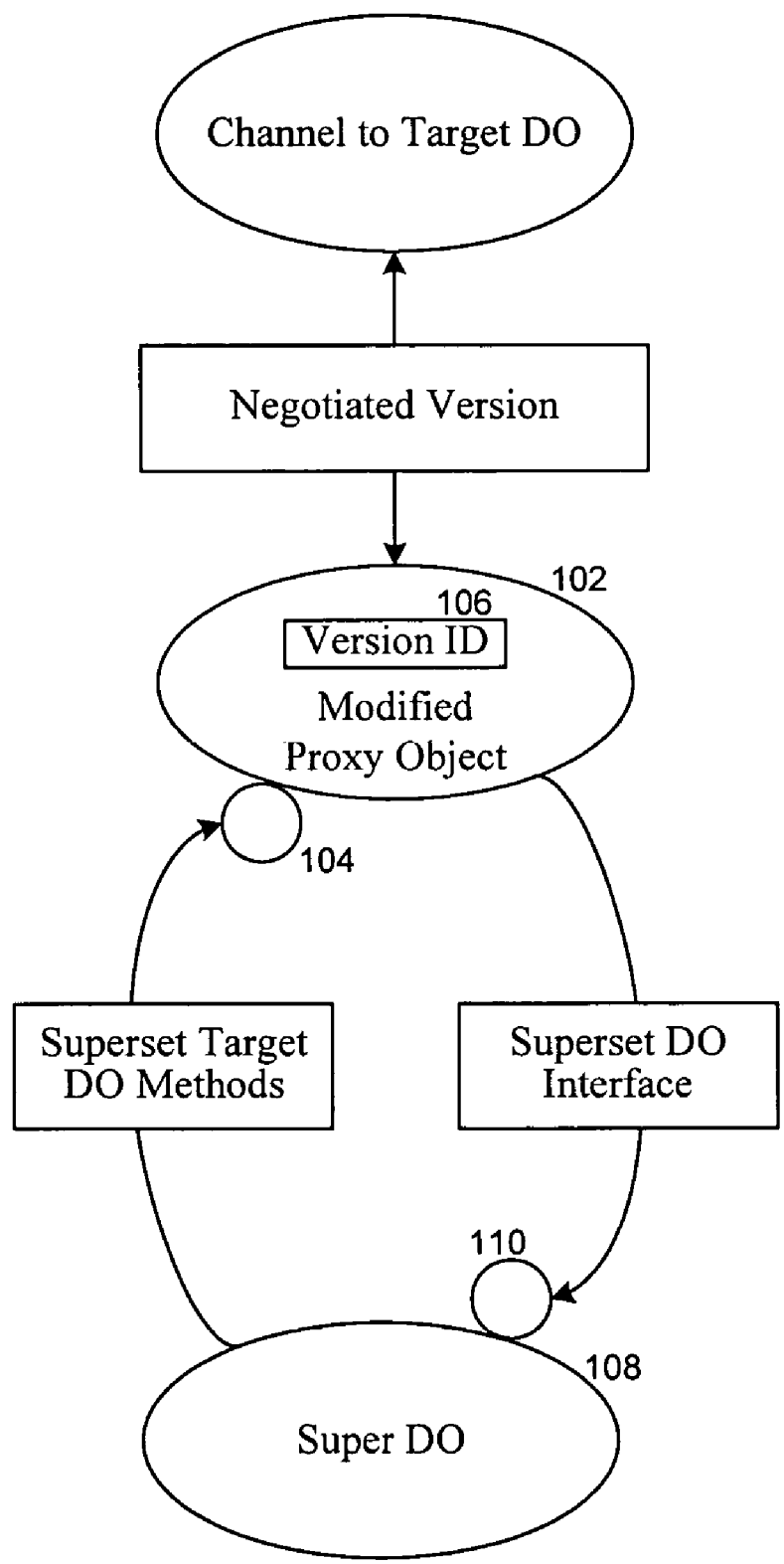
FIG. 1 is a block diagram illustrating a modified proxy object, according to one embodiment.

A method and system for providing a modified proxy object having a common, multi-version interface (also referred to herein as a "modified proxy" or "modified proxy object") is provided. In one embodiment, the modified proxy object implements one or a multiple versions of an interface, and the common, multi-version interface is a single interface that includes all the functionalities supported by all versions of the interface that are supported by the modified proxy object. Since the common, multi-version interface allows a DO to access the functionalities supported by the multiple versions of the interface, a subsystem programmed to create and use the modified proxy object(s) only needs to use the common, multi-version interface provided by the modified proxy object(s) to communicate with multiple, different versions of remote subsystems.

In one embodiment, the common, multi-version interface is comprised of a union of all the methods of all versions of the interface that are supported by the modified proxy object—i.e., the multi-version interface. For example, version 1 and version 2 of the same interface may have been as follows:

```
Interface_Version_1 {
    methodA( );
    methodB( );
}
Interface_Version_2 {
    methodA( );
    methodC( );
}
```

In the above example interface versions, methodB was removed and methodC added in version 2 of the interface. In this example, the common, multi-version interface that supports both version 1 and version 2 of the interface will be as follows:

```
Interface_Common {
    methodA( );
    methodB( );
    methodC( );
    getVersion( );
}
```

The common, multi-version interface, Interface_Common, allows a source subsystem and, in particular, a source DO to communicate with two different versions—i.e., version 1 and version 2—of a target DO. In addition, the common, multi-version interface exposes an additional method, getVersion( ), which may be called to obtain the version of the target—i.e., the remote object—that the modified proxy object is connected to. Stated differently, getVersion( ) identifies the version of the interface that is being represented by the instance of the modified proxy object. One skilled in the art will appreciate that the version information can be exposed through other means instead of the additional method "getVersion" in the interface. For example, the version information may be exposed or made available through programming means such as a variable, an attribute, etc.

One technical advantage is that there is only one type of proxy (i.e., the modified proxy object), and this proxy object implements multiple versions of an interface—i.e., protocol—and, thus, "knows" how to talk multiple protocols. The modified proxy object includes logic to support multiple versions of a target object, and also includes logic to perform error checking to ensure that a single instance of the modified proxy object models only a single version of the target object. Since the modified proxy object is only one type of proxy, a programmer only needs to change the subsystem (application) code that is affected by the supported versions of the protocol (interface) and, thus, the change to the subsystem code is proportional to the change affected by the change in the multiple versions of the protocol supported by the subsystem.

Another technical advantage is that since the source DO only deals with one common interface (Interface_Common), there is no duplication of code. For example, prior to the common interface, in order for the DO to support the two separate interfaces, Interface_Version_1 and Interface_Version_2, the DO needed to implement two separate code paths to call the methods in either Interface_Version_1 or Interface_Version_2. The separate code paths were required even for the methods that are common to both interfaces, which resulted in a large amount of duplicate code. With the common interface, the DO only deals with one interface, and there is no duplication of code. A similar principle applies to messages coming into the DO from, for example, clients. Since the DO supports one unified interface (e.g., interface 212 in FIG. 2), the DO only needs to implement one set of methods common to all versions and, thus, there is no duplication of code.

In the discussion that follows, various embodiments of the modified proxy object and its components are further described in conjunction with a variety of illustrative examples. It will be appreciated that the embodiments of the modified proxy object and its components may be used in circumstances that diverge significantly from these examples in various respects.

FIG. 1 is a block diagram illustrating a modified proxy object, according to one embodiment. By way of example, a client subsystem may support multiple versions, for example, version 1, version 2, and version 3, of a server subsystem. As such, the DOs in the client subsystem also support versions 1, 2, and 3, and the modified proxy objects created by the client subsystem also support versions 1, 2, and 3 of their respective target objects in the server subsystem. This allows the client subsystem to connect to and communicate with a target server subsystem that supports version 1, version 2, and/or version 3.

As depicted in FIG. 1, a modified proxy object 102 comprises a common, multi-version interface 104 and a version ID 106, and the modified proxy object is coupled to a super DO 108 comprising a super DO interface 110. The modified proxy object contains an implementation of a superset of the methods belonging to all the versions of the interface that it supports. The modified proxy object may implement and provide the common, multi-version interface, and this interface exposes the superset of the methods belonging to all the versions of the interface supported by the modified proxy object. The version ID identifies the version of the interface that has been negotiated between the super DO and a target DO. Thus, the version ID indicates the version of the target DO that this particular instance of the modified proxy object represents. The term "super DO" is used herein to generally refer to a DO that supports one or multiple versions of an interface. Accordingly, the super DO contains an implementation of a superset of the methods belonging to all of the supported versions of the DO. The super DO may implement and provide the super DO interface, and this interface exposes the superset of methods from all versions of the DO supported by the super DO.

Upon instantiation, the modified proxy object stores its version number in the version ID. The version number indicates the version of the interface—i.e., protocol—that this instance of the modified proxy object represents, and the version number allows the modified proxy object to perform error checking by, for example, ensuring that the super DO calls only methods allowed for that version. The modified proxy object also performs error checking by, for example, only accepting the methods allowed for the version of the interface from the target DO, and making the appropriate call into the super DO through the super DO interface.

Continuing the above example, assuming that the modified proxy object is created in the client subsystem, the modified proxy object contains an implementation of the superset of the methods belonging to version 1, version 2, and version 3 target DO in the server subsystem. Stated differently, the modified proxy object contains an implementation of the superset of the server subsystem methods to enable it to model version 1, version 2, or version 3 target DO in the server subsystem. The common, multi-version interface functions as an interface for outgoing traffic—i.e., traffic going from the client subsystem to the server subsystem—and exposes the superset of the methods belonging to version 1, version 2, and version 3 of the target DO on the server subsystem. The version ID identifies the version of the interface that has been negotiated by the super DO in the client subsystem and the target DO in the server subsystem. In this example, the version ID may indicate either version 1, version 2, or version 3, since the super DO can support version 1, version 2, and version 3 of the target DO. The super DO contains an implementation of the superset of the methods belonging to version 1, version 2, and version 3 DO in the client subsystem. The super DO interface functions to provide access to the methods exposed by the super DO for incoming traffic—i.e., traffic coming into the client subsystem—and exposes the superset of the methods belonging to version 1, version 2, and version 3 of the super DO.

In an example operation in accordance with the above example, the modified proxy object exposes the superset of the methods belonging to version 1, version 2, and version 3 of the target DO, and the super DO may make calls into the methods and with the behavior appropriate for the version negotiated on the wire—i.e., communication channel—for outgoing traffic. Assuming version 1 is negotiated between the super DO and the target DO, the super DO may make calls into the methods that belong to version 1—i.e., the methods that are supported by the version 1 interface of the target DO. For incoming traffic, the super DO exposes a superset of methods from version 1, version 2, and version 3 of the super DO through its super DO interface, and the modified proxy object only calls into the methods and with the behavior appropriate for the negotiated version. Assuming version 1 is negotiated between the super DO and the target DO, the modified proxy object may make calls into the methods that belong to version 1—i.e., the methods that are supported by the version 1 interface of the super DO.

Figure 2:
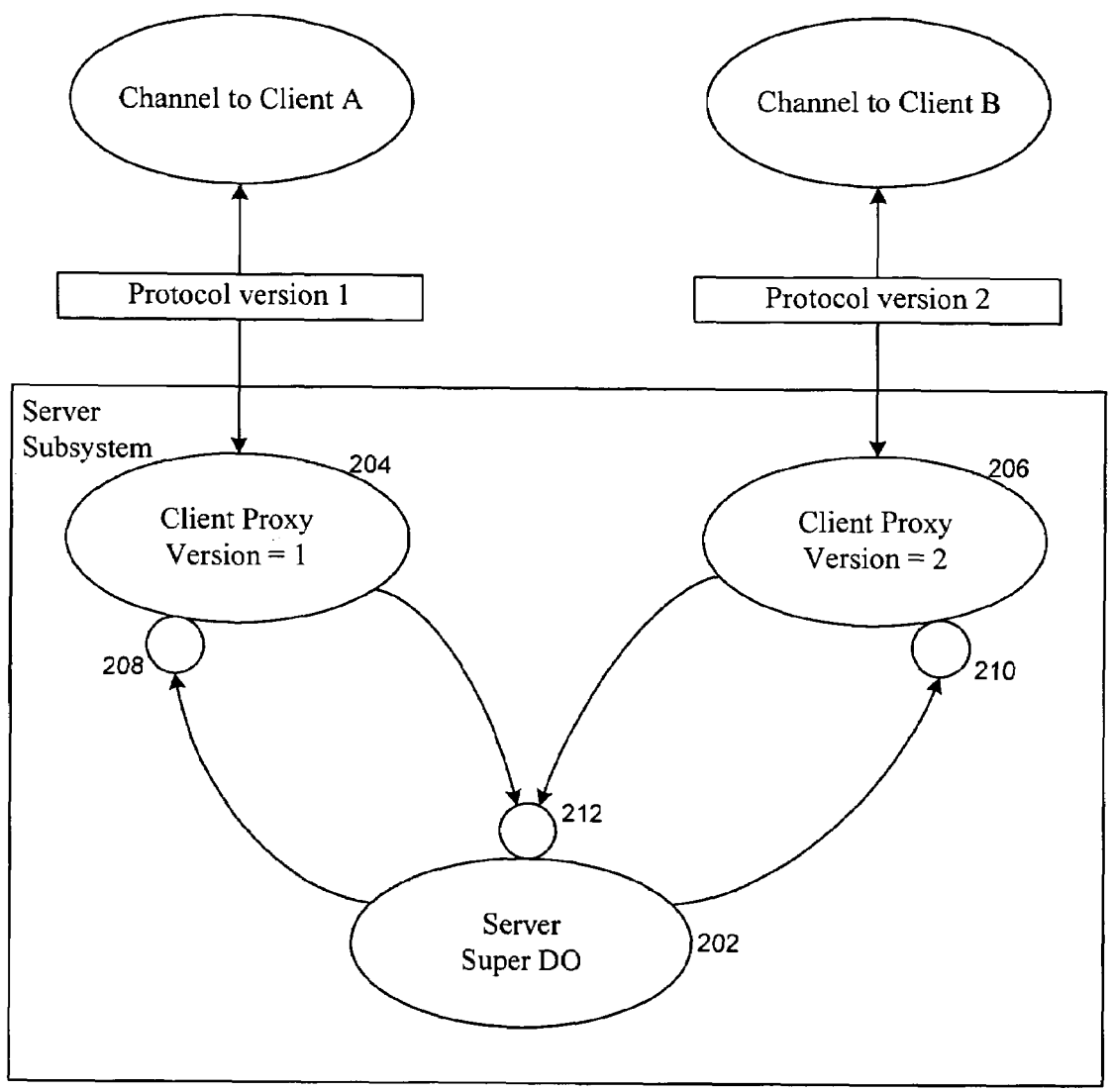
FIG. 2 is a block diagram illustrating a server subsystem using multiple instances of a modified proxy object to support multiple versions of a client subsystem, according to one embodiment.

FIG. 2 is a block diagram illustrating a server subsystem using multiple instances of a modified proxy object to support multiple versions of a client subsystem, according to one embodiment. By way of example, the server subsystem may support two versions—i.e., version 1 and version 2—of the interface pair server DO and client DO, in which case a super DO in the server implements both version 1 and version 2 of the server DO. Assuming that client A supports only version 1 while client B supports both version 1 and version 2, client A will have negotiated to use version 1 of the interface in communicating with the server, and client B may have negotiated to use version 2 of the interface.

As depicted in FIG. 2, a server super DO 202 uses a first instance 204 of the modified proxy object to communicate with client A, and a second instance 206 of the modified proxy object to communicate with client B. Since the modified proxy object contains an implementation of both version 1 and version 2 of the client, each instance of the modified proxy object contains the implementation of both version 1 and version 2 of the client. Even though an instance of the modified proxy object contains the implementation of both version 1 and version 2 of the client, the version ID allows each instance of the modified proxy object to behave as if it is modeling a single version of the client. Thus, the instance of the modified proxy object used to communicate with client A behaves or functions as if it is a remote client version 1 proxy. Similarly, the instance of the modified proxy object used to communicate with client B behaves or functions as if it is a remote client version 2 proxy.

The first instance of the modified proxy object functioning as a remote client 1 proxy only allows the server super DO to make calls to the methods supported by the negotiated version 1 interface, even though its common, multi-protocol interface 208 exposes or provides access to both the version 1 and version 2 methods. The first instance of the modified proxy object ensures that the server super DO utilizes only the version 1 methods by, for example, raising an error condition when the server super DO tries to make a call to a method supported in version 2. To avoid using inappropriate methods, a programmer may code the server super DO to request the instance of the modified proxy object to provide its version ID, and make the appropriate method call according to the provided version ID. The first instance of the modified proxy object also only accepts version 1 methods from client A, and makes the appropriate call into the server super DO through the super DO's super DO interface 212.

Similarly, the second instance of the modified proxy object functioning as a remote client 2 proxy only allows the server super DO to make calls to the methods supported by the negotiated version 2 interface, even though its common, multi-protocol interface 210 exposes or provides access to both the version 1 and version 2 methods. The second instance of the modified proxy object ensures that the server super DO utilizes only the version 2 methods by, for example, raising an error condition when the server super DO tries to make a call to a method supported in version 1. The second instance of the modified proxy object also only accepts version 2 methods from client B (even though, in this example, client B supports both version 1 and version 2), and makes the appropriate call into the server super DO through the super DO interface.

Even though the modified proxy object is described in conjunction with the operation of a server subsystem, one skilled in the art will appreciate that the benefits and technical advantages provided by the modified proxy object need not be restricted to the server subsystem. For example, the modified proxy object may be used by a client subsystem to allow the client subsystem to support multiple versions of a server subsystem. One skilled in the art will also appreciate that a client subsystem that uses the modified proxy object to support multiple versions of a server subsystem may communicate with a server subsystem that uses the modified proxy object to support multiple versions of a client subsystem. Moreover, even though the modified proxy object is described as implementing two versions of an interface, one skilled in the art will appreciate that the modified proxy object may implement a single version of an interface or any multiple number of versions of the interface. One skilled in the art will also appreciate that, even though only two instances of the modified proxy object were created in the subsystem, a different number of instances of the modified proxy object may be created in the subsystem depending on the number of target subsystems connected to the subsystem. One skilled in the art will further appreciate that a subsystem may create more than one DO, and that each DO created in the subsystem may use one or more modified proxy object instances to communicate with one or more respective target DOs.

The computer systems on which the subsystems and the modified proxy can execute may include a central processing unit, memory, input devices (e.g., keyboard and pointing devices), output devices (e.g., display devices), and storage devices (e.g., disk drives). The memory and storage devices are computer-readable media that may contain instructions that implement the subsystem, the interface files, and other components.

Embodiments of the modified proxy may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The subsystems and the modified proxy may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
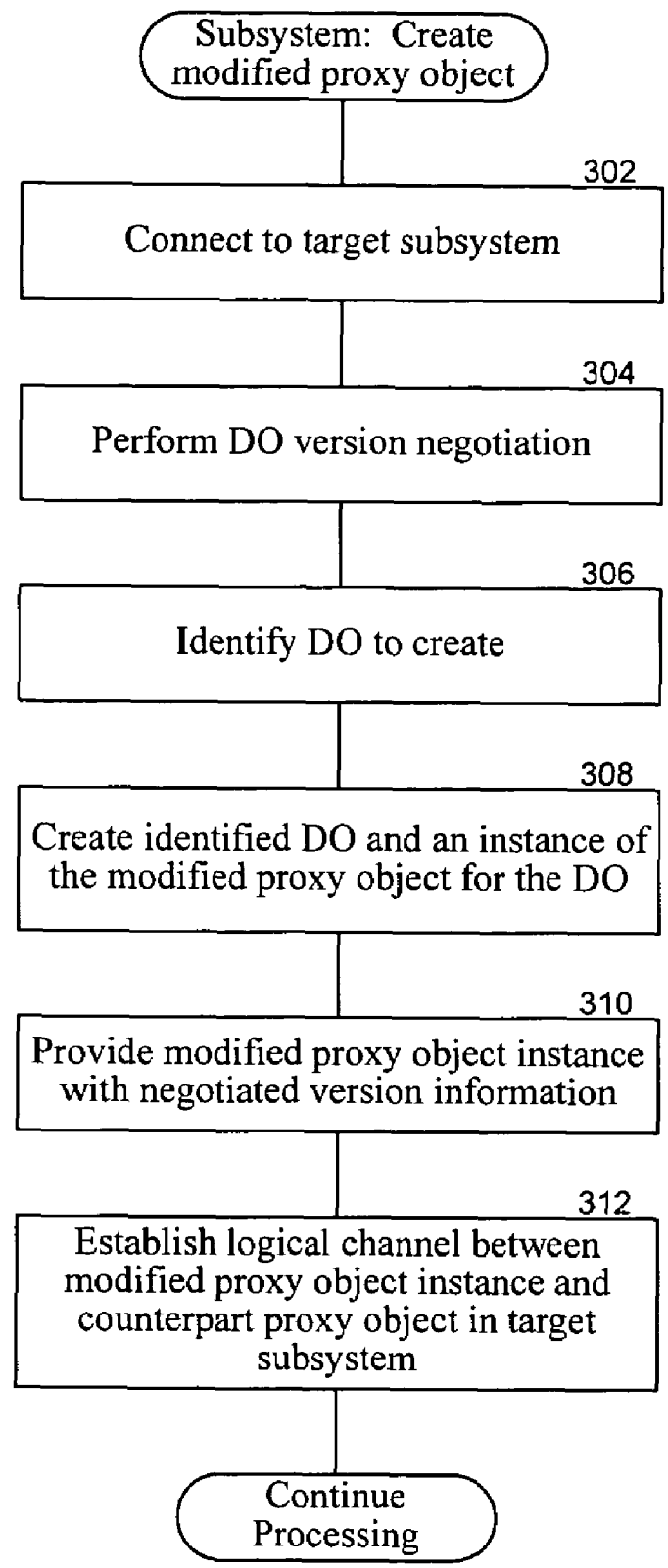
FIG. 3 is a flow diagram illustrating an example process by which a subsystem creates an instance of a modified proxy object, according to one embodiment.

FIG. 3 is a flow diagram illustrating an example process by which a subsystem creates an instance of a modified proxy object, according to one embodiment. By way of example, the subsystem may be a source subsystem that supports multiple versions of a target subsystem, and may have received a request to establish a connection from a target subsystem. In block 302, upon receiving the connection request, the source subsystem establishes a connection to the target subsystem. In block 304, the source subsystem and the target subsystem perform version negotiation to determine the version of the interfaces—i.e., the DOs—that are to be used between the source subsystem and the target subsystem. The versions of the DOs that are to be used can be determined—i.e., negotiated—from the DOs that are available to be created in both the source subsystem and the target subsystem. Additional details about negotiating the version of the interfaces is provided in U.S. patent application Ser. No. 11/066,717 entitled "Method and System for Version Negotiation of Distributed Objects," filed on even date herewith, which is incorporated by reference herein in its entirety.

In block 306, the source subsystem identifies a DO to create. In block 308, the source subsystem creates the identified DO and an instance of the modified proxy object for the DO. In block 310, the subsystem provides the instance of the modified proxy object with the negotiated version of the DO. For example, the DO may implement versions 1 and 2 of the source subsystem, while the target subsystem is version 2. In this instance, the source subsystem and the target subsystem may have negotiated to use version 2 (block 304), and the source subsystem indicates to the modified proxy object instance that it is to model version 2 of the target subsystem (block 310). In one embodiment, the modified proxy object, upon being instantiated, asks the source subsystem the version that the modified proxy object instance is to use, and may cache the version number internally. The modified proxy object instance exposes the version number to the corresponding DO in the source subsystem.

In block 312, the source subsystem establishes a logical channel between the modified proxy object instance and a counterpart proxy object in the target subsystem. The counterpart proxy object in the target subsystem is a remote source proxy that models the negotiated version of the DO in the source subsystem. Upon establishing the logical channel, the source subsystem continues processing. For example, if there are additional DOs to create and link up in the source subsystem, the source subsystem can perform blocks 306 to 310 for each additional DO to create.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-implemented method for allowing a source subsystem to communicate with multiple different versions of a target subsystem that expose different versions of an interface, the computer-implemented method comprising:

establishing a connection between the source subsystem and a target subsystem;

negotiating a version of the interface to use in communicating between the source subsystem and the target subsystem;

creating an instance of a proxy object in the source subsystem, the proxy object implementing each of the different versions of the interface and providing a common, multi-version interface that exposes a superset of methods of the different versions of the interface implemented by the proxy object;

providing the instance of the proxy object an indication of the negotiated version of the interface;

establishing a logical channel between the instance of the proxy object and a counterpart proxy object in the target subsystem, wherein the counterpart proxy object is a remote source proxy that models the negotiated version of the interface; and under control of the source subsystem, accessing the target subsystem by invoking methods of the proxy object such that the same methods are invoked irrespective of the version of the interface that is negotiated so that the source subsystem can access different versions of the target subsystem without having to use separate code paths for different versions and such that the instance of the proxy object and the counterpart proxy object communicate with each other using the negotiated version of the interface by the proxy object mapping invocations of its methods to invocations of methods of the negotiated version of the interface.

2. The computer-implemented method of claim 1, wherein the counterpart proxy object of the target subsystem exposes a superset of methods from the different versions of the interface, and wherein the instance of the proxy object only calls methods belonging to the negotiated version of the interface.

3. The computer-implemented method of claim 1, wherein the instance of the proxy object only accepts methods belonging to the negotiated version of the interface over the logical channel from the counterpart proxy object.

4. The computer-implemented method of claim 1, wherein the instance of the proxy object exposes an additional method for obtaining the negotiated version of the interface.

5. The computer-implemented method of claim 1, wherein the instance of the proxy object performs error checking to ensure that the proxy object only invokes methods belonging to the negotiated version of the interface.

6. A computer-readable storage medium storing computer-executable instructions for allowing a source subsystem to communicate with multiple different versions of a target subsystem that expose different versions of an interface, the computer-executable instructions comprising instructions for:

establishing a connection between the source subsystem and a target subsystem;

negotiating a version of the interface to use in communicating between the source subsystem and the target subsystem;

creating an instance of a proxy object in the source subsystem, the proxy object implementing each of the different versions of the interface and providing a common, multi-version interface that exposes a superset of methods of the different versions of the interface implemented by the proxy object;

providing the instance of the proxy object an indication of the negotiated version of the interface;

establishing a logical channel between the instance of the proxy object and a counterpart proxy object in the target subsystem, wherein the counterpart proxy object is a remote source proxy that models the negotiated version of the interface; and under control of the source subsystem, accessing the target subsystem by invoking methods of the proxy object such that the same methods are invoked irrespective of the version of the interface that is negotiated so that the source subsystem can access different versions of the target subsystem without having to use separate code paths for different versions and such that the instance of the proxy object and the counterpart proxy object communicate with each other using the negotiated version of the interface by the proxy object mapping invocations of its methods to invocations of methods of the negotiated version of the interface.

7. The computer-readable storage medium of claim 6, wherein the counterpart proxy object of the target subsystem exposes a superset of methods from the different versions of the interface, and wherein the instance of the proxy object only calls methods belonging to the negotiated version of the interface.

8. The computer-readable storage medium of claim 6, wherein the instance of the proxy object only accepts methods belonging to the negotiated version of the interface over the logical channel from the counterpart proxy object.

9. The computer-readable storage medium of claim 6, wherein the instance of the proxy object exposes an additional method for obtaining the negotiated version of the interface.

10. The computer-readable storage medium of claim 6, wherein the instance of the proxy object performs error checking to ensure that the proxy object only invokes methods belonging to the negotiated version of the interface.

* * * * *